Dec. 24, 1968     L. A. NOWOTNY     3,417,477

TEMPLATE FOR THE GAS CUTTING OF HOLES

Filed Dec. 22, 1967

Inventor
Lloyd A. Nowotny
By Forest C. Sexton
Attorney 3,417,477
TEMPLATE FOR THE GAS CUTTING OF HOLES
Lloyd A. Nowotny, Milwaukee, Wis., assignor to Allis-Chalmers Manufacturing Company, Milwaukee, Wis.
Filed Dec. 22, 1967, Ser. No. 692,756
11 Claims. (Cl. 33—174)

ABSTRACT OF THE DISCLOSURE

A hole cutting template for use in combination with a template tracing gas cutting machine having a faceplate with an aperture, the configuration of which is that of the intended hole. A movable cam is secured behind said faceplate which may be locked in a position whereby one edge thereof is exposed through said aperture. To cut a hole, the template tracing means first follows the edge of the cam thus starting the cut at a point inward from the intended hole edges. After the template tracer moves onto the aperture walls, the cam is moved out of the way so that the aperture can be completely traced.

Background of the invention

This invention relates generally to gas cutting machines of the type having a template following mechanism to guide the cutting torch along the workpiece in a path defined by a template. More specifically, this invention relates to a new and improved circular template to be used in conjunction with such a machine for gas cutting holes.

Gas cutting machines of the character having a template follower are so well known in the prior art that they need not be detailed here. It should be sufficient to say that such machines usually comprise one or more gas cutting torch heads rigidly secured below some sort of movable bridge or double pivot frame structure. A template tracer, usually a motor driven rotating magnetic pin, is also secured to the movable or pivotal frame structure. A template of any desired shape is rigidly fixed in the vicinity of the template tracer but independent of the frame structure. In operation, the template tracer drives itself along the edge of the template causing movement of the frame structure so that the torch head or heads secured thereto will each trace and cut the outline of the template against the workpiece.

Such cutting machines as described above have greatly contributed to the gas cutting art by providing a quick and easy way to make reproducible precision cuts. As a result, manufacturing costs have in many instances been greatly reduced by substituting such gas cutting techniques for more costly and time consuming machining operations. In many manufacturing processes, the time savings alone is a very substantial advantage.

In some instances, template tracing gas cutting machines have even replaced the drill press for cutting ordinary holes in plate metal. Although such gas cut holes can be made much faster than ordinary drilled holes, the gas cut holes as a rule leave something to be desired. That is to say, gas cut holes are so far from perfect that they are not acceptable for many applications. To understand why, it must be noted that when an ordinary straight or irregular cut is made across a piece of metal from one edge to another, the cut or kerf is started at the edge of the workpiece. Hence, the torch flame is unobstructed as it starts the cut, and the molten slag can readily be blown from the kerf as soon as a kerf is started. In addition, as the cut is finished, the torch can be advanced beyond the edge of the workpiece so that all the molten slag is blown free before the torch is shut off. Thus, in ordinary applications, a gas torch will produce a neat and smooth cut. On the other hand, when a cut is started within the body of the workpiece, as when a hole is cut, the characteristics of the cut are not as neat and smooth as might be desired. This is because the workpiece itself will obstruct the torch flame until the piece is pierced through, and thus the molten slag will not readily flow from the kerf in line with the desired cut. Therefore, until the torch flame completely pierces through the workpiece, the obstruction will cause the flame to be deflected, and the slag is blown back up through the penetrating cut. As a result, the workpiece is usually severely gouged and pitted at the point where the cut was started. In addition, when the cut is finished within the body of the workpiece, along a previously formed kerf, and the torch is then shut off, a small amount of molten slag may remain in the kerf at the shut-off point.

One solution to the above discussed problem has been to start or finish the cut at a point which is radially inward from the surface of the hole to be cut. That is to say, the metal is pierced at some point near the center of the desired hole. After the workpiece is pierced, the torch will cut smoothly and neatly and can then be advanced outward towards the circumference of the intended hole. Then after the circumference is traced and the hole cut, the torch is moved back inward before it is shut off. By such practices, any cutting irregularities caused by starting or finishing the cut will be contained within the discarded slug and not at the cut surface of the hole. To effect this technique in template tracing machines, circular templates having a radial slot have been employed. In operation, the metal is pierced while the template tracer is within the radial slot. Any gouging or pitting will then be restricted to a point radially inward from the intended hole surface. The template tracer then moves out of the slot and onto periphery of the template, and the desired hole is cut as the tracer traces the periphery of the template. As the cut is completed, the template tracer moves back into the radial slot pulling the torch away from the hole surface. Once the torch has moved away from the hole surface, it can be shut off and any slag not blown from the kerf will be contained within the slug radially inward from the circular hole surface.

Although the template as described above has greatly improved the characteristics of the gas cut holes, there still remains disadvantages to such holes as compared to drilled holes. Specifically, there is usually a small metal protrusion or peak on the cut hole surface at the point where the torch moves into and away from the periphery of the cut. This is because the radial slot in the circular template must, of course, be slightly wider than the diameter of the template tracer, so that the tracer may freely move along its surfaces. Therefore, the tracer moves outward on one surface of the slot and inward on the other surface so that the tracer and torch trace a path which is slightly less than a complete 360 degrees.

Summary of the invention

This invention is predicated upon my conception and development of a new and improved hole cutting template of the female type having a completely circular tracing surface with no starting or stopping indentations. A pivotal cam system is attached to the template to start the cut within the interior area of the intended hole, and pivots out of the way after the template tracer moves to the circular portion of the template.

Description of the preferred embodiments

Figure 1:
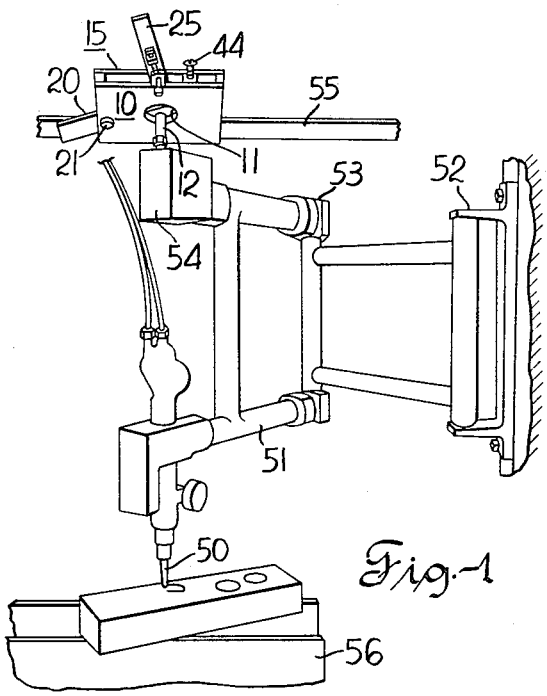
FIG. 1 is a perspective view of a typical template following gas cutting machine with a template of this invention incorporated therewith.

Referring to the drawings, one embodiment of the template of this invention comprises a fixed faceplate 10 having an aperture 11 through the approximate center thereof. This faceplate 10 is itself the female type template and hence the aperture 11 should have a configuration the same as that of the intended hole to be cut. The aperture 11 will, of course, be slightly larger than the hole cut therewith because the axis of the template tracer 12 (FIG. 4) will follow a path radially inward from aperture 11 by a distance equal to the radius of the template tracer 12.

A backplate 15 is secured in a spaced parallel relationship to faceplate 10 by any means such as bolts 16 and spacers 17. As shown in the drawings, backplate 15 does not have an aperture therethrough coinciding with aperture 11 in faceplate 10. It is obvious, however, that such a coinciding aperture should be provided in the event the template tracer 12 is of such excessive length that backing plate 12, without such an aperture, will interfere with its proper insertion and operation.

Figures 2, 3:
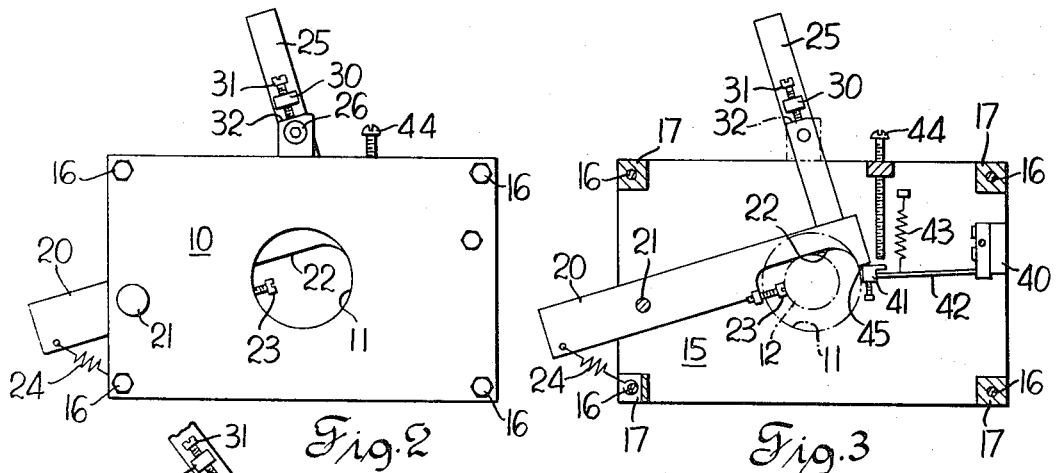
FIG. 2 is a plan view of the template shown on the machine in FIG. 1.
FIG. 3 is a plan view identical to that shown in FIG. 2 except that the faceplate has been removed showing the internal mechanism in starting position.
Figure 4:
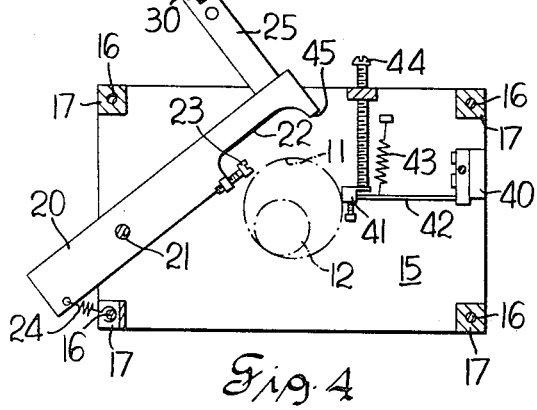
FIG. 4 is a plan view identical to that shown in FIG. 3 except that the cam has been pivoted to the finishing position as is done when the template tracer reaches the outer portion of the template opening.

An elongated cam 20 is pivotally sandwiched between the two plates 10 and 15 by any means such as a pin or bolt 21. The cam 20 is of such configuration that in its closed position (FIGS. 2 and 3) a portion of the inner edge thereof 22 extends across the opening of aperture 11. As shown in FIGS. 3 and 4, the edge 22 of cam 20 exposed through aperture 11 is spaced away from the exact axis of aperture 11 with one end thereof curving to blend tangentially with the arcuate edge of aperture 11. Although this exact position and configuration of edge 22 is not critical, it is preferred for reasons which shall subsequently become obvious. An adjustable screw 23, threaded into the cam 20 so that the head thereof is perpendicular to edge 22, is also exposed through aperture 11. In the open position (FIG. 4), no portion of cam 20 or screw 23 should be exposed through aperture 11. A biasing means, such as spring 24, may be provided to pivot and hold the cam 20 in the open or finishing position.

A releasable bracing means, such as slide bar 25, is also provided to temporarily hold cam 20 in the closed or starting position (FIGS. 2 and 3). The bracing means should be releasably operable to release cam 20 so that it may be pivoted to the open or finishing position. As shown in the drawings, the releasable bracing means comprises an elongated slide bar 25 one end of which is rigidly and perpendicularly secured to the cam 20, and a bolt 26, threaded through faceplate 10 which can be tightened against slide bar 25 when the cam 20 is in the starting position. Therefore, when cam 20 is manually pivoted to the starting position bolt 26 may be tightened against slide bar 25 to hold cam 20 in this position (FIG. 3). When bolt 26 is loosened, bracing spring 24 pivots cam 20 to the finishing position (FIG. 4).

In order to more easily position the cam 20 in the starting position, a stop block means should be provided against which cam 20 can rest to be properly placed for starting. If it is preferred that cam 20 have a variable starting position, as when template tracers 12 of different radii may be used, the stop block means should be adjustable. As shown in the drawings, the stop block means comprises a flange 30 secured perpendicularly to that portion of slide bar 25 extending away from faceplate 10, with cap screw 31 threaded therethrough and against the edge 32 of faceplate 10. Hence, cap screw 31 should be adjusted so that it rests firmly against edge 32 of faceplate 10 when cam 20 is in the proper starting position. Adjustment of cap screw 31 will vary the starting position of cam 20.

If preferred, an automatic shut-off mechanism may be easily incorporated with the above described template which will automatically shut off the cutting torch or torches when the cutting is complete or which will signal the operator when the cutting is complete. One way in which this can be done is to provide a low voltage contact switch 40 rigidly secured between the two end plates 10 and 15. The signal switch activator 41 is secured to a cantilever rod 42 adjacent to the aperture 11. The switch activator 41 and rod 42 should not contact either of the end plates 10 and 15. A second biasing means, such as spring 43 biases activator 41 against adjustment screw 44 so that the edge of activator 41 is flush with aperture 11 at the point where the template tracer first contacts the edge of aperture 11. This is when cam 20 is in the finishing position. When cam 20 is in the starting position, however, surface 45 thereof deflects activator 41 away from adjustment screw 44 and away from the edge of aperture 11. Accordingly, the low voltage signal switch is wired so that a signal is given or the torch or torches shut off when template tracer 12 contacts activator 41.

FIG. 1 illustrates one of the many types of template tracing cutting machines with which this invention can be incorporated. The cutting torch 50 is rigidly secured to a frame structure 51 which can freely pivot at hinge 52 and elbow 53. Hence, the torch 20 can move freely within a defined horizontal plane. The template tracer 12 is positioned directly above torch 50. A small electric motor, enclosed in box 54, slowly rotates the template tracer 12 causing it to be driven along the inner or outer periphery of any template secured to template arm 55.

In the operation of this invention, the template as described above is secured to the template holding means on any template tracing cutting machining, as for example, to arm 55 of the type machine shown in FIG. 1. Screws 23 and 31 should be adjusted so that when cam 20 is in the closed or starting position, the template tracer 12 can be centered in aperture 11 by resting against the head of screw 23 and surface 22 of cam 20. Screw 44 should be adjusted so that when cam 20 is in the open or finishing position, switch activator 41 is flush with the wall of aperture 11 at the point where tracer 12 first touches said wall of aperture 11. These adjustments to screws 23, 31 and 44 need not be repeated upon subsequent use of the template unless a tracer 12 of a different radius is used, or unless the operator prefers to pierce the workpiece at some point other than the axial center of the intended hole. When the template is properly placed and adjusted, the workpiece to be cut is placed on the cutting machine bed 56 with the desired hole location directly under the template, and tracer 12 positioned within aperture 11. It should be appreciated that on some cutting machines, especially those for driving a plurality of cutting torches, the template and the tracer 12 may be at some position other than directly over the workpiece. Cam 20 should then be pivoted to the closed or starting position (FIGS. 2 and 3) and there held in place by tightening bolt 26 against bar 25. This will cause activator 41 to be pivoted away from screw 44 and the wall of aperture 11. Template tracer 12 is then centered by permitting it to rest against the head of screw 23 and surface 22. With tracer 12 properly centered, the torch or torches 50 may be ignited and the workpiece pierced thereby. After the workpiece has been pierced, tracer 12 is activated causing it to roll along surface 22 away from screw 23. The curved portion of surface 22 then blends aperture 11. The torch 50 will, of course, cut an identical path in the workpiece therebelow. After tracer 12 has started to roll along the wall of aperture 11, bolt 26 path in the workpiece therebelow. After tracer 12 has started to roll along the wall of aperture 11, bolt 26 should be loosened, permitting spring 24 to pivot cam 20 to the open or finishing position (FIG. 4). Simultaneously, spring 43 activates switch 40 by pivoting activator against screw 44. Tracer 12 continues to roll along the wall of aperture 11 as the hole is cut in the workpiece therebelow. When tracer 12 has completed a 360 degree arc within aperture 11, it will contact activator 41 to either automatically shut off the torch 50, or activate a signal whereupon the operator may shut it off, to prevent any overcutting.

It is obvious that many modifications and different embodiments could be employed in this template without departing from the basic concept of the invention. For example, it is obvious that tracing configurations other than circular could be incorporated in the template. Hence, any shape of hole could be cut upon proper design of aperture 11. The elongated cam 20 is subject to an extensive variation in design, and could be designed to slide or fall as well as pivot upon release thereof. The means for locking cam 20 into the starting position is also subject to an extensive variation in design. For example, it could comprise a separate pivotal or slidable bar not secured to cam 20, or it could comprise a pin or bolt braced against cam 20 itself. Other systems could be used in making the various adjustments as effected in the drawings by screws 23, 31 and 44, or if uniform use of the template is contemplated, then these adjustment means could be completely eliminated and replaced by permanent stop blocks or the like. Backplate 15 could be eliminated, at the sacrifice of some rigidity, by having all attachments secured only to the back side of faceplate 10. And, it is also obvious that the automatic shut off or finish signal system is also subject to a variation of design or could be eliminated if preferred. Accordingly, this invention should not be limited to the detailed example given herein, but may be modified within the scope of the appending claims.

The embodiments of the invention in which an exclusive property or privilege is claimed are defined as follows:

1. A hole cutting template for use in combination with a gas cutting machine of the type having a template tracing means, said template comprising a fixed faceplate having an aperture therethrough to receive said template tracing means, the configuration of said aperture being the same as that of the intended hole, an elongated cam movably secured behind said faceplate, a releasable bracing means to hold said cam in a starting position immediately behind said faceplate whereby one edge of said cam is exposed through said aperture extending transversely to at least one wall of said aperture so that said template tracing means will first trace a path defined by the exposed edge of said cam and a portion of the walls of said aperture, said releasable bracing means being operable to release said cam so that said cam may be moved to a finishing position away from said aperture and said template tracing means so that the template tracing means will finish tracing a path defined by the aperture alone.

2. A hole cutting template according to claim 1 further comprising a backplate spaced from said faceplate whereby said cam is movably sandwiched between said backplate and said faceplate.

3. A hole cutting template according to claim 1 further comprising a first adjustment means for adjusting the starting position of said cam.

4. A hole cutting template according to claim 1 further comprising a second adjustment means on the edge of said cam exposed through said aperture to adjust the starting position of said template tracing means.

5. A hole cutting template according to claim 1 further comprising a biasing means to automatically move said cam to the finishing position upon release thereof by the releasable bracing means.

6. A hole cutting template according to claim 1 further comprising a signal means disposed behind said faceplate with an edge thereof substantially tangent to the wall of said aperture at the point where said template tracer will completely trace said aperture, said signal means being responsive to provide a signal upon contact with said template tracer.

7. A hole cutting template according to claim 6 wherein said signal means is responsive to shut off the cutting machining upon contact with the template tracer.

8. A hole cutting template according to claim 1 wherein said elongated cam is pivotally secured to said faceplate.

9. A hole cutting template according to claim 1 wherein one end of the edge of said cam exposed through said aperture while said cam is in the starting position, blends tangentially with one wall of said aperture.

10. A hole cutting template according to claim 1 wherein said releasable bracing means to hold said cam in a starting position comprises a bolt threaded through said faceplate which may be tightened against said cam while said cam is in the starting position.

11. A hole cutting template according to claim 4 wherein said second adjustment means comprises a screw threaded into said cam so that the head thereof is exposed through said aperture perpendicular to the edge of said cam exposed through said aperture.

References Cited
UNITED STATES PATENTS

| | | |
|---|---|---|
| 2,062,380 | 12/1936 | Smith. |
| 2,178,938 | 11/1939 | Ohmstede. |
| 2,607,989 | 8/1952 | Peterson et al. |
| 3,084,923 | 4/1963 | Arnault et al. |

HARRY N. HAROIAN, *Primary Examiner.*

U.S. Cl. X.R.

33—23, 24; 90—62; 266—23